Dec. 1, 1931.  W. E. HOLLAND ET AL  1,834,778
ELECTRICAL SYSTEM
Filed May 26, 1927

Inventors:
Walter E. Holland,
William H. Grimditch,
by their Attorneys,
Howson & Howson Patented Dec. 1, 1931

1,834,778

UNITED STATES PATENT OFFICE

WALTER E. HOLLAND AND WILLIAM H. GRIMDITCH, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA

ELECTRICAL SYSTEM

Application filed May 26, 1927. Serial No. 194,401.

Our invention relates to electrical systems, and it has particular relation to systems of control, such, for example, as are applicable to vacuum-tube circuits.

In its broad aspect, one object of our invention is to provide voltage-regulating means for an electrical system, wherein a single manual control simultaneously adjusts the voltage at a plurality of points in said system.

A more specific object of our invention is to provide means whereby the voltage and current available at the output terminals of a current-supply device may be varied to values suitable for different loads, such, for example, as the audio-frequency amplifier, radio-frequency amplifier and detector plate circuit loads present in a radio system.

Another object of our invention is to provide in a radio current-supply device having a plurality of positive direct-current output terminals and a common negative terminal, a resistor network having a single adjustable resistor adapted to vary simultaneously the voltages at two or more of the positive terminals.

Figure 1:
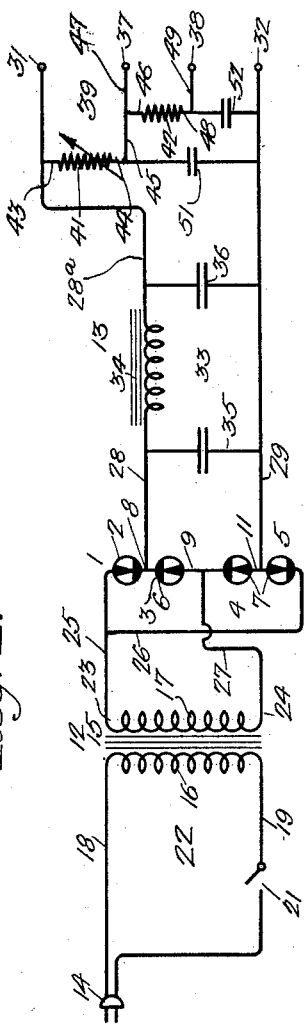
Figure 2:
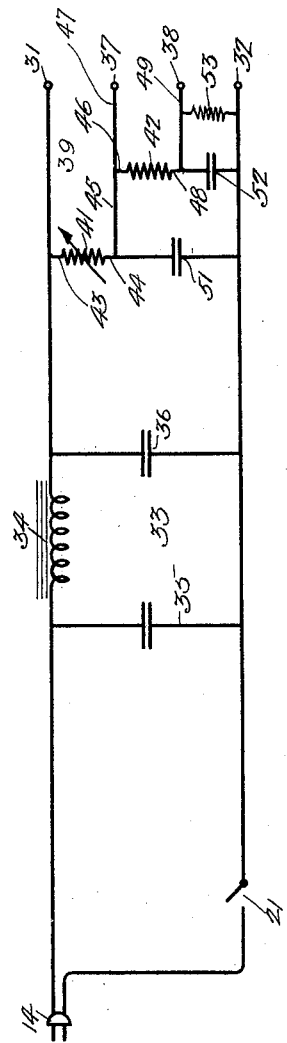

Although the primary object of our invention is to provide a resistor network for the voltage regulation of radio power-supply devices, certain features are capable of general application, as will be brought out more fully in the accompanying description, claim and drawings, wherein Fig. 1 is a diagrammatic view of circuits and apparatus embodying my invention; and Fig. 2 is a similar view, but illustrating a modification.

Referring to Fig. 1, a rectifier 1 comprises a set of rectifying units or cells, 2, 3, 4 and 5, which may be of any well-known type, such, for example, as cells employing aluminum, tantalum, or other film-forming metal as a rectifying electrode. Each cell comprises the customary cathode 6 and anode 7. A conductor 8 serves to connect the cathodes of the cells 2 and 3. The anode of cell 3 and the cathode of cell 4 are connected by a conductor 9, while the anodes of the cells 4 and 5 are connected by a conductor 11.

The rectifier 1 is provided with an input circuit 12 and an output circuit 13, the former being connected to a reversible plug 14 adapted to be associated with an alternating-current supply circuit (not shown).

The circuit 12 may include a transformer 15 comprising a primary winding 16 and a secondary winding 17. The transformer, however, may have a single winding only, if desired, as in an auto-transformer. The terminals of the primary winding 16 are connected by conductors 18 and 19 through a switch 21 to the plug 14, thus completing a transformer primary circuit 22.

The secondary winding 17 is provided with terminals 23 and 24, the terminal 23 being connected by conductors 25 and 26 to the anode of cell 2 and the cathode of cell 5. The terminal 24 is connected by a conductor 27 and the conductor 9 to the anode of the cell 3 and the cathode of cell 4.

The circuit 13 extending from the rectifier 1 comprises main positive and negative conductors 28 and 29 which respectively extend from the conductors 8 and 11 to positive and negative direct-current output terminals 31 and 32. These terminals may represent the positive and negative circuit connections for a vacuum-tube receiving system (not shown), though it is apparent that other load circuits may be connected instead, should it be desirable to employ the power-supply device for a purpose other than radio.

The pulsation in the rectified currents traversing the output conductors 28 and 29 may be smoothed out by means of filter apparatus 33, comprising an inductive reactor 34, which is serially included in the positive conductor 28 and capacitive reactors 35 and 36 which are connected in shunt relation to the output circuit 13 on opposite sides of the inductive reactor 34.

When the plug 14 is electrically connected to the alternating current supply circuit (not shown), alternating currents traverse the primary circuit 22 and, as a result, alternating potentials are established in the secondary winding 17 of the transformer 15. Assuming that at any particular instant the terminal 24 of the transformer secondary winding 17 is positive and the terminal 23 negative, then currents flow from the transformer winding 17 through the conductor 27, the conductor 9, the cell 3, the conductor 8, the positive conductor 28, the choke coil 34 and the conductor 28a to positive terminal connection 31. From here the currents may pass through, say, the plate circuit of a power amplifier tube (not shown) to the negative terminal connection 32. The current next flows from the terminal 32 through the negative conductor 29, the conductor 11, the cell 5, the conductor 26 and the conductor 25 to the transformer secondary winding 17.

When the polarity of the transformer secondary winding 17 reverses, then currents pass from the secondary terminal 23 through the conductor 25, the cell 2, the conductor 28, the choke coil 34 and the conductor 28a to the amplifier apparatus (not shown) associated with the terminal connections 31 and 32, the negative conductor 29, the cell 4 and the conductor 27, to the transformer secondary winding 17. Thus both half waves of the alternating-current cycle are rectified and the output terminals 31 and 32 are supplied with a substantially constant direct-current potential.

In accordance with our invention, additional direct-current output terminals 37 and 38 are provided in the event that the current-supply device is associated with a vacuum-tube system (not shown) employing, say, amplifier and detector circuits requiring reduced plate voltages,—our invention, in particular, contemplating the use of a resistor network 39 characterized by the fact that a single adjustment effects a simultaneous variation in the voltages at at least two of the direct-current terminals 31, 37 and 38. To this end, we provide a variable resistor 41 and a fixed resistor 42. One terminal 43 of the resistor 41 is connected to the positive conductor 28a and direct-current terminal 31. An opposite terminal 44 is connected by a conductor 45 to an adjacent terminal 46 of the fixed resistor 42.

The direct-current terminal 37 is connected by conductor 47 to the conductor 45, so that the variable resistor 41 is connected in shunt relation to the positive direct-current terminals 31 and 37. The resistor 41, however, is connected in series relation with the fixed resistor 42. A remaining terminal 48 of the fixed resistor 42 is connected by a conductor 49 to the direct-current terminal 38. The relative resistance values of the resistors 41 and 42 are preferably such that the adjustment of the variable resistor 41 causes a large variation in the voltage or power delivered to the terminal 37 and a simultaneous but smaller variation at the terminal 38.

The variable resistor 41 may be connected to the negative conductor 29 through a capacitive reactor 51 which affords a high impedance to the direct currents traversing the output circuit 13 but a relatively low impedance to alternating currents. Thus a slight filtering effect is established which is supplemental to that of the filter apparatus 33. Inasmuch as the capacitive reactor 51 is connected in shunt relation to the output terminals 37 and 32, a low impedance path is afforded such alternating or fluctuating currents as are established in the circuits connected to the said output terminals.

A further connection to the negative conductor 29 is afforded by means of a capacitive reactor 52 which extends from the terminal connection 38 and the resistor 42 to the negative conductor 29. The capacitive reactor 52 also serves as a low impedance path for alternating currents established in the external circuit (not shown) connected to the terminal connections 38 and 32, but a high impedance path to direct currents.

In operation, assuming that load circuits are connected to the pairs of terminals, 31—32, 37—32, and 38—32, respectively, which require predetermined high, medium and low voltages, and that the plug 14 is electrically connected to an alternating current supply circuit (not shown), the variable resistor 41 is adjusted until the desired voltage and power requirements at the pairs of terminals whose voltages are controllable are established. It is noted that such regulation involves the adjustment of one resistor only. When used with a radio receiving set, the regulation can be accomplished by anyone by means of the ear and without using meters. This greatly simplifies what has heretofore been an exceedingly uncertain process.

Fig. 2 illustrates diagrammatically a current-supply system operating directly from a source of direct-current energy (not shown), the system being distinguishable from Fig. 1 in the absence of the transformer 15 and the rectifier 1. The resistor network 39 is also slightly modified in the fact that a third fixed resistor 53 is connected in shunt relation to the capacitive reactor 52 and across the low voltage terminals 38 and 32. The operation of this resistor network, however, is otherwise described in connection with Fig. 1.

While we have shown only two embodiments of our invention, for the purpose of describing the same and illustrating their principles of construction and operation, it is apparent that various changes and modifications may be made therein, without departing from the spirit of our invention, and we desire, therefore, that only such limitations shall be imposed thereon, as are indicated in the appended claim or as are demanded by the prior art.

We claim:

In an electrical power supply system for radio receiving systems, the combination of a source of uni-directional current having a plurality of positive output terminals and a negative terminal for supplying potentials to the amplifier and detector stages of said receiving systems and means for simultaneously adjusting said potentials comprising a variable resistance connected between the terminals of the amplifier stages, a fixed resistance connected between one of the terminals of said amplifier stages and the terminal of the detector stage whereby the detector potential may be varied in accordance with the amplifier potential, and a condenser connected from one of the amplifier terminals to said negative terminal and another condenser connected from the detector terminal to said negative terminal for substantially reducing any variations in said uni-directional current which may be present and to provide a low impedance return for the signal currents of said receiving systems.

WALTER E. HOLLAND.
WILLIAM H. GRIMDITCH.